United States Patent
Tai et al.

(10) Patent No.: US 9,057,127 B2
(45) Date of Patent: Jun. 16, 2015

(54) PLATED RESIN MOLDED ARTICLES

(75) Inventors: Toshihiro Tai, Osaka (JP); Weihong Gu, Hyogo (JP); Tatsuo Izumitani, Hyogo (JP)

(73) Assignees: DAICEL POLYMER LTD., Tokyo (JP); DAICEL CHEMICAL INDUSTRIES, LTD., Sakai-shi, Osaka (JP)

( * ) Notice: Subject to any disclaimer, the term of this patent is extended or adjusted under 35 U.S.C. 154(b) by 1760 days.

(21) Appl. No.: 10/586,378

(22) PCT Filed: Feb. 16, 2005

(86) PCT No.: PCT/JP2005/002827
§ 371 (c)(1),
(2), (4) Date: Jul. 14, 2006

(87) PCT Pub. No.: WO2005/080075
PCT Pub. Date: Sep. 1, 2005

(65) Prior Publication Data
US 2008/0027165 A1    Jan. 31, 2008

(30) Foreign Application Priority Data

Feb. 20, 2004 (JP) .................. 2004-043925

(51) Int. Cl.
| | |
|---|---|
| *B32B 15/08* | (2006.01) |
| *C08K 5/06* | (2006.01) |
| *C08K 5/05* | (2006.01) |
| *B05D 3/00* | (2006.01) |
| *C23C 18/16* | (2006.01) |
| *B32B 15/088* | (2006.01) |
| *C08K 5/053* | (2006.01) |
| *C23C 18/20* | (2006.01) |

(52) U.S. Cl.
CPC .......... *C23C 18/1641* (2013.01); *B32B 15/088* (2013.01); *C08K 5/053* (2013.01); *C23C 18/1653* (2013.01); *C23C 18/2086* (2013.01)

(58) Field of Classification Search
USPC ........... 428/458; 524/755, 115, 386; 427/307, 427/304
See application file for complete search history.

(56) References Cited

U.S. PATENT DOCUMENTS

| | | | | |
|---|---|---|---|---|
| 5,326,811 | A  * | 7/1994 | Sano et al. ............... | 524/505 |
| 6,476,105 | B2 * | 11/2002 | Jeong et al. ............... | 524/99 |
| 2002/0045056 | A1 * | 4/2002 | Grefenstein et al. .......... | 428/515 |
| 2003/0059621 | A1 | 3/2003 | Tai et al. | |

FOREIGN PATENT DOCUMENTS

| | | | |
|---|---|---|---|
| JP | 57-123048 | | 7/1982 |
| JP | 59-142244 | | 8/1984 |
| JP | 07-330934 | | 12/1995 |
| JP | 7-330934 | | 12/1995 |
| JP | 2000-345031 | * | 12/2000 |
| JP | 2003-82138 | | 3/2003 |
| JP | 2003-166067 | | 6/2003 |
| JP | 2004-2996 | | 1/2004 |

* cited by examiner

*Primary Examiner* — Kevin R Kruer
(74) *Attorney, Agent, or Firm* — Flynn, Thiel, Boutell & Tanis, P.C.

(57) ABSTRACT

The present invention provides a plated resin molded article having a high adhering strength of a plating layer. Specifically, it provides a plated resin molded article that has a metal plating layer on the surface of a thermoplastic resin molded article comprising a composition that contains
(A) 10 to 90 mass % of a matrix resin that has a water absorption after 24 hours in 23° C. water (ISO62) of at least 0.6% and
(B) 90 to 10 mass % of a non-styrenic resin that has a water absorption after 24 hours in 23° C. water (ISO62) of less than 0.6%, wherein the thermoplastic resin molded article is not subjected to etching with a heavy metal-containing acid.

16 Claims, No Drawings

PLATED RESIN MOLDED ARTICLES

This application is a National Stage Application of International Application No. PCT/JP05/02827, filed Feb. 16, 2005, claiming priority based on Japanese patent Application No. JP 2004-043925, filed Feb. 20, 2004.

TECHNICAL FIELD

The present invention relates to plated resin molded articles having a high plating strength and to a method of producing them.

RELATED ARTS

Resin molded articles such as an ABS resin and a poly amide resin have been used as automobile parts for the purpose of reducing the weight of an automobile, and plating such as copper or nickel is carried out on the resin molded articles in order to give a upscale image and a sense of beauty.

When the plating is carried out on resin molded articles such as an ABS resin, an etching step of roughing the surface of the resin molded articles is conventionally essential to enhance the adhering strength after the removal step of fat. For example, when an ABS resin molded article and a polypropylene molded article are plated, a bath of chromic acid (a mixed solution of chromium (III) oxide and sulfuric acid) is used after the removal step of fat, and an etching treatment is required to be carried out at 65 to 70° C. for 10 to 15 minutes. Accordingly, poisonous hexa-valent chromic acid ion is contained in waste water. Therefore, a treatment of neutrally precipitating after reducing the hexa-valent chromic acid ion to a tri-valent ion is essential.

Considering safety during a work at a spot and an influence to environment due to waste water thus, it is desirable not to carry out an etching treatment using the chromium bath, but in that case, there is a problem that the adhering strength of a plating layer to a molded article which is obtained by an ABS resin and the like cannot be enhanced.

The inventions in JP-A 2003-82138 and 2003-166067 solve this problem with the prior art by providing, without requiring a chromate bath-based etching treatment, plated resin molded article having a highly adherent metal plating layer.

In JP-A 2003-82138 and 2003-166067, plated resin molded articles in which the surface of a resin molded article containing polyamide and a styrene-based resin such as ABS resin or a resin molded article containing polypropylene was metal plated are disclosed.

DISCLOSURE OF THE INVENTION

An object of the present invention is to provide plated resin molded articles with a beautiful appearance and a high resin molded aritcle/plating layer adhesive strength even in the case of resin molded articles comprising a combination of polyamide with a thermoplastic resin other than a styrene-type resin.

An additional object of the present invention is to provide a method of producing the aforementioned plated resin molded articles that makes it possible to dispense with etching with, for example, chromic acid.

During the course of accumulating additional research into the inventions disclosed in JP-A 2003-82138 and JP-A 2003-166067, the present inventors identified a mechanism through which a strong metal plating may be formed on the surface of a thermoplastic resin molded article, i.e., that the moisture absorption of the resin present in the thermoplastic resin molded article is connected to the formation of a strong metal plating. As a result of research based on this newly discovered mechanism, the inventors discovered novel combinations of thermoplastic resins and were thereby able to provide application to a broader range of technical fields.

As means for achieving the object cited first, the present invention provides a plated resin molded article that has a metal plating layer on the surface of a thermoplastic resin molded article comprising a composition that contains (A) 10 to 90 mass % of a matrix resin that has a water absorption after 24 hours in 23° C. water (ISO62) of at least 0.6%, and (B) 90 to 10 mass % of a non-styrene-type resin that has a water absorption after 24 hours in 23° C. water (ISO62) of less than 0.6%, wherein the thermoplastic resin molded article is not subjected to etching with a heavy metal-containing acid.

As means for achieving the additional object, the present invention provides a method of producing a plated resin molded article wherein the aforementioned plated resin molded article is produced by plating metal on the surface of the thermoplastic resin molded article, the method comprising the step of:

contact-treatment of the thermoplastic resin molded article with an acid or base that does not contain a heavy metal, as a treatment preceding a metal plating step, and wherein a step of etching with a heavy metal-containing acid is not included.

Plated resin molded articles according to the present invention exhibit a high adhesive strength between the thermoplastic resin molded article and the metal plating layer and present a beautiful appearance. The production method according to the present invention is superior to the prior-art plating methods in that it provides these plated resin molded articles by treatment under mild conditions without the use of treatment with a heavy metal-containing acid, such as chromic acid or potassium permanganate.

DETAILED DESCRIPTION OF THE INVENTION

The method according to the present invention of producing plated resin molded articles will be described hereinbelow in combination with a description of the plated resin molded articles according to the present invention. The method according to the present invention of producing plated resin molded articles is not particularly limited as long as a step of bringing the thermoplastic resin molded article into contact with an acid or base that does not contain a heavy metal (referred to below as the "acid or base contact treatment step") is included as a treatment preceding the metal plating step and a step of etching with a heavy metal-containing acid is not included. Some of the following process steps can be omitted and other know plating steps can be added.

(Production of the Thermoplastic Resin Molded Article)

The thermoplastic resin molded article is a molded article of a composition that contains components (A) and (B) and other components present on an optional basis.

The matrix resin (A) has a water absorption of at least 0.6%, preferably 0.6 to 11%, more preferably 0.6 to 5%, and even more preferably 0.6 to 2.5%.

Preferred for the matrix resin (A) are, polyamide-type resins, acrylate salt-type resins, cellulose-type resins, vinyl alcohol-type resins and polyether-type resins, in each case that satisfy the saturated water absorption cited above, wherein polyamide-type resins and polyether-type resins are more preferred and polyamide-type resins are most preferred.

The polyamide-based resin is a polyamide-based resin which is formed by a diamine and a dicarboxylic acid and a copolymer thereof. For example, there are mentioned a nylon 66, a polyhexamethylenesebacamide (nylon 6,10), a polyhexamethylenedodecanamide (nylon 6,12), a polydodecamethylenedodecanamide (nylon 12,12), a polymethaxylyleneadipamide (nylon MXD6), a polytetramethyleneadipamide (nylon 4,6), and a mixture thereof and a copolymer; copolymers such as a nylon 6/66, a nylon 66/6T in which a 6T component is 50% by mol or less (6T: polyhexamethyleneterephthalamide), a nylon 66/6I in which a 6I component is 50% by mol or less (6I: polyhexamethyleneisophthalamide), a nylon 6T/6I/66 and a nylon 6T/6I/610; copolymers such as a polyhexamethyleneterephthalamide (nylon 6T), a polyhexamethyleneisophthalamide (nylon 6I), a poly(2-methylpentamethylene)terephthalamide (nylon M5T), a poly(2-methylpentamethylene)isophthalamide (nylon M5I), a nylon 6T/6I and a nylon 6T/M5T. Additionally, a copolymer nylon such as an amorphous nylon may be used, and as the amorphous nylon, a polycondensate of terephthalic acid and trimethylhexamethylene diamine and the like may be proposed.

Further, the ring opening polymer of a cyclic lactam, a polycondensate of an amino carboxylic acid and a copolymer consisting of these components, specifically, aliphatic polyamide resins such as a nylon 6, a poly(ω-undecanamide) (nylon 11) and a poly(ω-dodecanamide) (nylon 12), and a copolymer thereof; a copolymer with a polyamide consisting of a diamine and a dicarboxylic acid, specifically, a nylon 6T/6, a nylon 6T/11, a nylon 6T/12, a nylon 6T/6I/12, a nylon 6T/6I/610/12 and the like, and a mixture thereof can be included.

As the polyamide-based resin, a PA (nylon) 6, a PA (nylon) 66 and a PA (nylon) 6/66 are preferable among the above-mentioned polyamide resins.

Component (B) has a water absorption less than 0.6% and more preferably no greater than 0.4% and excludes styrene-type resins. Styrene-type resin denotes polymer containing 10 mass % or more structural units originating from styrene and styrene derivatives such as α-substituted or ring-substituted styrenes.

Preferred for component (B) are olefin-type resins, polyphenylene ether resins (PPE), polyphenylene sulfone resins (PPS), polysulfone resins, acrylic resins (excluding, however, acrylate salt-type resins), and their alloys, in each case that satisfy the saturated water absorption cited above.

The olefin-based resin is a polymer in which a mono-olefin having 2 to 8 carbons is a main monomer component, and there can be included one kind or more polymers which are selected from a low density polyethylene, a high density polyethylene, a linear low density polyethylene, a polypropylene, an ethylene-propylene random copolymer, an ethylene-propylene block copolymer, a polymethylpentene, a poly (1-butene), and a modified product thereof and the like. Among these, a polypropylene and an acid-modified polypropylene are preferable.

Specific examples of polyphenylene ethers usable by the present invention are poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly(2-(4'-methylphenyl)-1,4-phenylene ether), poly (2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether). The use of poly (2,6-dimethyl-1,4-phenylene ether) is particularly preferred among the preceding.

Components (A) and (B) prepared by emulsion polymerization, bulk polymerization, suspension polymerization, or a known polymerization method that combines the preceding can be used.

The proportions of components (A) and (B) in the composition are 10 to 90 mass %, preferably 20 to 80 mass %, and more preferably 30 to 70 mass % for component (A) with component (B) making up the remainder in each case (total=100 mass %).

The water-soluble substance constituting component (C) is a substance that has a solubility (25° C.) in 100 g water of 300 g or less, preferably a solubility of 100 g or less, and more preferably a solubility of 10 g or less. The adhesive strength of the metal plating layer is increased by the presence of component (C) in the thermoplastic resin molded article.

Component (C) can be exemplified by the following, in each case that satisfy the solubility cited above: polysaccharides such as starch, dextrin, pulrane, hyaluronic acid, carboxymethyl cellulose, methyl cellulose, ethyl cellulose, or a salt thereof; poly-valent alcohols such as propylene glycol, ethylene glycol, diethylene glycol, neopentyl glycol, butanediol, pentanediol, polyoxyethylene glycol, polyoxypropylene glycol, trimethylol propane, pentaerythritol dipentaerythritol and glycerin; polyvinylalcohol, polyacrylic acid, polymaleic acid, polyacryl amide, polyvinyl pyrrolidone, polyethylene oxide, acrylic acid-maleic anhydride copolymer, maleic anhydride-diisobutylene copolymer, maleic anhydride-vinyl acetate copolymer, a polycondensate of naphthalene sulfonate with formalin and a salt thereof. Preferred among the preceding are pentaerythritol (solubility=7.2 g/100 g) and dipentaerythritol (solubility 0.1 g or less per 100 g).

The component (C) content in the composition is preferably 0.01 to 50 mass parts, more preferably 0.01 to 30 mass parts, and even more preferably 0.01 to 15 mass parts, in each case per 100 mass parts of the total of components (A) and (B).

Component (D) is a surfactant and/or coagulant. The surfactant may be a surfactant that remains in the resin from the surfactant (emulsifying agent) used when emulsion polymerization is employed to produce component (A) or (B), or may be a surfactant that is specifically added to component (A) or (B) when a production method is used that does not employ surfactant, such as bulk polymerization. The adhesive strength of the metal plating layer is increased by the presence of component (D) in the thermoplastic resin molded article.

The surfactant and coagulant may be those other than those which are used in the emulsion polymerization, in addition to those which are used in the emulsion polymerization, and the surfactant is preferably an anionic surfactant, a cationic surfactant, a nonionic surfactant, and an amphoteric surfactant.

As these surfactants, anionic surfactants such as a salt of an aliphatic acid, a salt of rosin acid, an alkyl sulfonate, an alkylbenzene sulfonate, an alkyldiphenyl ether sulfonate, a polyoxyethylenealkyl ether sulfonate, a diester salt of sulfosuccinic acid, an ester salt of α-olefin sulfonic acid or an α-olefin sulfonate; cationic surfactants such as a mono or dialkylamine or a polyoxyethylene adduct thereof, or a mono or di-long chain alkyl quatery ammonium salt; nonionic surfactants such as an alkyl glucoside, a polyoxyethylenealkyl ether, a polyoxyethylenealkyl phenyl ether, sucrose ester of an aliphatic acid, sorbitan ester of an aliphatic acid, a polyoxyethylene sorbitan ester of an aliphatic acid, a polyoxyethylene ester of an aliphatic acid, a polyoxyethylene-propylene block copolymer, mono glyceride of an aliphatic acid or amine oxide; amphoteric surfactants such as carbobetaine, sulfobetaine or hydroxysulfobetaine are included.

The proportion of component (D) in the composition is preferably 0.01 to 10 mass parts, more preferably 0.01 to 5 mass parts, and even more preferably 0.01 to 2 mass parts, in each case per 100 mass parts of the total of components (A) and (B).

As the phosphorus compound constituting component (E), one or more selected from the following can be used. The adhesive strength of the metal plating layer is increased by compounding the component (E) into the thermoplastic resin molded article.

Triphenyl phosphate, tricresyl phosphate, trixylenyl phosphate, tris(isopropylphenyl) phosphate, tris(o- or p-phenylphenyl) phosphate, trinaphthyl phosphate, cresyl diphenyl phosphate, xylenyl diphenyl phosphate, di(isopropylphenyl) phenyl phosphate, o-phenylphenyl dicresyl phosphate, tris(2, 6-dimethylphenyl) phosphate, condensed phosphate esters such as tetraphenyl m-phenylene diphosphate, tetraphenyl p-phenylene diphosphate, phenyl resorcinol polyphosphate, bisphenol A-bis(diphenyl phosphate), bisphenol A·polyphenyl phosphate or dipyrocatechol hypodiphosphate.

Aliphatic acid•aromatic phosphate esters such as orthophosphate esters such as diphenyl (2-ethylhexyl) phosphate, diphenyl 2-acryloyloxyethyl phosphate, diphenyl 2-methacryloyloxyethyl phosphate, diphenyl neopentyl phosphate, pentaerythritol diphenyl diphosphate or ethyl pyrocatechol phosphate.

Alkali metal salts of melamine polyphosphate tripolyphosphoric acid, pyrophosphoric acid, orthophosphoric acid, hexametaphosphoric acid, and so forth; and phosphoric acid compounds such as phytic acid and the alkali metal salts and alkanolamine salts thereof.

In addition to the preceding, phosphorus compounds known for use as flame retardants and antioxidants for resins can be used as the phosphorus compound.

The proportion of component (E) in the composition is preferably 0.1 to 30 mass parts, more preferably 0.1 to 20 mass parts, and even more preferably 0.1 to 10 mass parts, in each case per 100 mass parts of the total of components (A) and (B).

In addition to components (A) and (B) and components (C) to (E), the composition can contain, within a range that achieves the objects of the present invention, those additives known for incorporation in thermoplastic resins, for example, compatibilizers for components (A) and (B) and copolymers of components (A) and (B).

The thermoplastic resin molded article can be obtained by molding the composition containing components (A) to (E) and so forth into a desired, application-adapted shape by a known method, such as injection molding or extrusion molding.

(Treatment of the Removal of Fat)

The thermoplastic resin molded article is subjected to a treatment of the removal of fat. The treatment of the removal of fat is carried out by a surfactant aqueous solution which contains an alkali such as sodium hydroxide and sodium carbonate, or acids such as sulfuric acid and carbonic acid. In the present invention, after the treatment of the removal of fat, the step can be transferred to other steps, and an etching treatment by an acid containing heavy metals such as chromic acid or potassium permanganate (in the present invention, such as chromium or manganese) which becomes a roughening treatment for enhancing the adhering strength of a plating layer is unnecessary.

(The Acid or Base Contact Treatment Step)

After the treatment of the removal of fat, the thermoplastic resin molded article is then subjected to the contact treatment with an acid or base. The non-heavy metal acid or base used in this step is preferably present in a low concentration, preferably less than 4.0 normal, more preferably 3.5 normal or less, and even more preferably 3.0 normal or less.

For the treatment of this step, for example, a method of immersing the thermoplastic resin molded article in an acid or base which does not contain a heavy metal can be applied, and a method of immersing it in an acid or base at a liquid temperature of 10 to 80° C. which does not contain a heavy metal for 0.5 to 20 minutes can be applied.

As the acid which does not contain a heavy metal, an acid and the like which is selected from organic acids such as acetic acid, citric acid and formic acid in addition to hydrochloric acid, phosphoric acid and sulfuric acid can be used. As the base which does not contain a heavy metal, a base and the like which are selected from the hydroxides of an alkali metal or an alkali earth metal such as sodium hydroxide, potassium hydroxide, calcium hydroxide and magnesium hydroxide can be used.

(Other Steps)

The acid or base contact treatment step can be followed by steps such as, for example, a water rinse, treatment with a catalyst application bath, a water rinse, treatment with an activation bath (activation step) and a water rinse. Treatment with the catalyst application bath and treatment with the activation bath can be carried out at the same time.

The treatment by a catalyst imparting liquid is immersion, for example, in a 35% hydrochloric acid solution (10 to 20 mgl$^{-1}$) of stannic chloride (20 to 40 gl$^{-1}$) for about 1 to 5 minutes at room temperature. The treatment by an activating liquid is immersion in a 35% hydrochloric acid solution (3 to 5 mgl$^{-1}$) of palladium chloride (0.1 to 0.3 gl$^{-1}$) for about 1 to 2 minutes at room temperature.

An electroless plating step is thereafter carried out once or two or more times as desired. A plating bath that contains, for example, nickel, copper, cobalt, nickel-cobalt alloy, or gold, and a reducing agent, for example, formalin or hypophosphite, can be used. The pH and temperature of the plating bath are selected in correspondence to the type of plating bath being used.

When an additional plating treatment is to be carried out after the electroless plating, an electroplating step, for example, with copper, can also be added after an activation treatment with acid or base.

Use of the production method according to the present invention can provide a high adhesive strength between the thermoplastic resin molded article and the metal plating layer, and a maximum value for the adhesive strength according to JIS H8630 of preferably at least 10 kPa, more preferably at least 50 kPa, even more preferably at least 100 kPa, and particularly preferably at least 150 kPa can be obtained.

At the time the present application was filed, the following was considered to be one mechanism for the increased adhesive strength between the thermoplastic resin molded article and metal plating layer in plated resin molded article according to the present invention.

Prior to the plating treatment, the thermoplastic resin molded article has a "sea-island structure" in which component (A) forms the sea and component (B) forms islands. When component (C) is present, component (B) undergoes aggregation to give a sea-island structure in which larger domains have been formed. When component (C) is not present, a sea-island structure is formed in which component (B) is microdispersed.

When the acid or base contact treatment is carried out on the thermoplastic resin molded article with this "sea-island structure", the matrix resin phase (component (A)) in the surface layer of the molding undergoes swelling to form a swollen layer. As the catalyst component permeates into this swollen layer, the catalyst component forms nuclei, and the plating metal attaches to and grows at these nuclei, forming a three-dimensional network structure. It is believed that a metal plating layer that is highly adherent to the molding's surface is formed as a result of the growth of the plating from the interior of the swollen layer in this manner. It is also thought that the component (B) resin phase acts during this process to preserve or maintain the swollen layer, so that a molding lacking component (B) and containing only component (A) is unable to form a metal plating layer with a high adhesive strength.

It has been conventionally desirable that the surface of a resin molded article is roughened by an etching treatment using an acid or base having a high concentration, in order to enhance the adhering strength of a plating layer. However, in the present invention, the adhering strength of a metal plating layer can be enhanced by adding the contact-treatment step with an acid or base having a low concentration without carrying out a surface roughening treatment, and an effect that safety at working is enhanced and drainage treatment becomes easy can be obtained in combination.

The plated resin molded article obtained by applying the production method according to the present invention can be applied to various uses and are particularly suitable for application as automotive parts such as bumpers, emblems, wheel caps, interior parts or exterior parts.

EXAMPLES (1) Adherence Test of Plating Layer

The adhering strength (kPa, the highest value) between the thermoplastic resin molded article and a metal plating layer was measured according to the adherence test method described in appendix 6 in JIS H8630 using the plated resin molded articles obtained in the following Examples and Comparative Examples.

(2) Thermoplastic Resin Molded Articles

Test pieces of 100×50×3 mm obtained by injection molding each of the compositions consisting of components shown in Table 1 (a cylinder temperature of 240° C., and a mold temperature of 60° C.) were used. The details of the respective components are as described below.

Component (A)

A-1: Polyamide 6, Ube Nylon 6 1013B, manufactured by UBE Industries, Ltd., water absorption=1.8%

A-2: Polyamide 66, Ube Nylon 66 2020B, manufactured by UBE Industries, Ltd., water absorption=1.3%

A-3: 6-66 copolyamide, Ube Nylon 5013B, manufactured by UBE Industries, Ltd., water absorption=2.0%

A-4 (comparative component): polyamide 12, Ube Nylon 12 3024U, manufactured by UBE Industries, Ltd., water absorption=0.25%

Component (B)

B-1: Poly(2,6-dimethyl-1,4-phenylene ether), a polyphenylene ether resin with an intrinsic viscosity of 0.40 (30° C., in chloroform), water absorption=0.07%

B-2: Polypropylene resin, PMB60A, manufactured by SunAllomer Ltd., water absorption no more than 0.01%

B-3: Olefin copolymer, MH7010, manufactured by Mitsui Chemicals, Inc., water absorption=0.05%

B-4: Polyester resin, Dainite MA-521H, manufactured by Mitsubishi Rayon Co., Ltd., water absorption=0.16%

Component (C)

C-1: Dipentaerythritol (manufactured by Koei Chemical Co., Ltd.)

Component (D)

D-1: α-Olefin sulfonate (LIPOLAN PB800 manufactured by LION Corporation)

Component (E)

E-1: Triphenyl phosphate (manufactured by Daihachi Chemical Industry Co., Ltd.)

Examples 1-11

The thermoplastic resin molded article consisting of components in Table 1 was used, and a plated resin molded article was obtained according to the steps below. The adherence of the plating layer is shown in Table 1.

(i) Removal step of fat: The test piece was immersed in a 50 g/L aqueous solution (a solution temperature of 40° C.) of ACECLEAN A-220 (manufactured by OKUNO Pharmaceuticals Co., Ltd.) for 20 minutes.

(ii) Contact-treatment step by acid: The test piece was immersed in 100 ml aqueous solution (a solution temperature of 40° C.) of 1.0 normal hydrochloric acid for 5 minutes.

(iii) Catalyst imparting step: The test piece was immersed in a mixed aqueous solution (a solution temperature of 25° C.) of 150 ml/L of 35% by weight of hydrochloric acid and 40 ml/L aqueous solution of Catalyst C (manufactured by OKUNO Pharmaceuticals Co., Ltd.) for 3 minutes.

(iv) The first activation step: The test piece was immersed in 100 ml/L aqueous solution (a solution temperature of 40° C.) of 98% by weight of sulfuric acid for 3 minutes.

(v) The second activation step: The test piece was immersed in 15 g/L aqueous solution (a solution temperature of 40° C.) of sodium hydroxide for 2 minutes.

(vi) Electroless plating step of nickel: The test piece was immersed in a mix aqueous solution (a solution temperature of 40° C.) of 150 ml/L of Chemical Nickel HR-TA (manufactured by OKUNO Pharmaceuticals Co., Ltd.) and 150 ml/L of Chemical Nickel HR-TB (manufactured by OKUNO Pharmaceuticals Co., Ltd.) for 5 minutes.

(vii) Acid activation step: The test piece was immersed in 100 g/L aqueous solution (a solution temperature of 25° C.) of TOP SAN (manufactured by OKUNO Pharmaceuticals Co., Ltd.) for one minute.

(viii) Electroplating step of copper: The test piece was immersed in a plating bath having the under-mentioned composition (a solution temperature of 25° C.), and electroplate was carried out for 120 minutes.

(Composition of Plating Bath)

Copper sulfate ($CuSO_4 \cdot 5H_2O$): 200 g/L

Sulfuric acid (98%): 50 g/L

Chlorine ion ($Cl^-$): 5 ml/L

TOP LUCINA 2000 MU (manufactured by OKUNO Pharmaceuticals Co., Ltd.): 5 ml/L

TOP LUCINA 2000 A (manufactured by OKUNO Pharmaceuticals Co., Ltd.): 0.5 ml/L

Comparative Examples 1-7

The thermoplastic resin molded article consisting of components in Table 1 was used, and a plated resin molded article was obtained in the same manner as Example 1. The adherence of the plating layer is shown in Table 1.

TABLE 1

| | | Examples | | | | | | | | | | | Comparative examples | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 | 6 | 7 |
| (A) | A-1 (water absorption = 1.8%) | 60 | | | 60 | 60 | 60 | 60 | 60 | 60 | 60 | 60 | | | | | | | |
| | A-2 (water absorption = 1.3%) | | 60 | | | | | | | | | | | | | | | | |
| | A-3 (water absorption = 2.0%) | | | 60 | | | | | | | | | | | | | | | |
| | A-4 (water absorption = 0.25%) | | | | | | | | | | | | 60 | 60 | 60 | 60 | | | |
| (B) | B-1 (water absorption = 0.07%) | 40 | 40 | 40 | | | | 40 | 40 | 40 | 40 | 40 | 40 | | | | 100 | | |
| | B-2 (water absorption no more than 0.01%) | | | | 40 | | | | | | | | | 40 | | | | 100 | |
| | B-3 (water absorption = 0.05%) | | | | | 40 | | | | | | | | | 40 | | | | |
| | B-4 (water absorption = 0.16%) | | | | | | 40 | | | | | | | | | 40 | | | 100 |
| (C) | C-1 | | | | | | | 2 | 2 | 2 | | | | | | | | | |
| (D) | D-1 | | | | | | | | 10 | 10 | 10 | 10 | | | | | | | |
| (E) | E-1 | | | | | | | | | 2 | | 2 | | | | | | | |
| | Adhesive strength (kPa) | 82 | 55 | 45 | 52 | 45 | 30 | 120 | 130 | 140 | 90 | 100 | could not be plated | could not be plated | could not be plated | could not be plated | could not be plated | could not be plated | could not be plated |

(A) and (B) sum to 100 mass %; and
(C) to (E) are given in mass parts per 100 mass parts of the sum of (A) and (B).

The invention claimed is:

1. A plated resin molded article that has a metal plating layer provided on the surface of a thermoplastic resin article formed from a composition comprising the following components:
   (A) 30 to 70 mass % of a matrix resin that has a water absorption after 24 hours in 23° C. water, according to ISO62, of at least 0.6% and selected from the group consisting of a polyamide 6 resin, a polyamide 66 resin and a polyamide 6/66 resin;
   (B) 70 to 30 mass % of a polyphenylene ether-based resin;
   (C) a water-soluble substance having a solubility at 25° C. of not more than 300 g in 100 g of water and selected from the group consisting of pentaerythritol and dipentaerythritol in an amount of 0.01 to 2 mass parts per 100 mass parts of the sum of components (A) and (B);
   (D) at least a surfactant in an amount of 0.01 to 10 mass parts per 100 mass parts of the sum of components (A) and (B), the surfactant being an α-olefin sulfonate; and
   (E) a phosphorus compound comprising one or more members selected from the group consisting of a condensed phosphate ester, an aliphatic acid aromatic phosphate ester of an orthophosphate ester, an alkali metal salt of melamine polyphosphate tripolyphosphoric acid, pyrophosphoric acid, orthophosphoric acid or hexametaphosphoric acid and phytic acid, an alkali metal salt thereof and an alkanolamine salt thereof in an amount of 0.1 to 2 mass parts per 100 mass parts of the sum of components (A) and (B).

2. The plated resin molded article according to claim 1, wherein the maximum value of the adhesive strength, according to JIS H8630, between the thermoplastic resin molded article and the metal plating layer is at least 10 kPa.

3. The plated resin molded article according to claim 1, applied as an automotive component.

4. The plated resin molded article according to claim 1, wherein component (A) is polyamide 6, component (B) is poly(2,6-dimethyl-1,4-phenylene ether) and component (C) is dipentaerythritol.

5. The plated resin molded article according to claim 1, wherein component (A) is polyamide 6, component (B) is poly(2,6-dimethyl-1,4-phenylene ether), component (C) is dipentaerythritol, component (D) is an α-olefin sulfonate and component (E) is triphenyl phosphate.

6. The plated resin molded article according to claim 1, wherein the condensed phosphate esters are selected from the group consisting of triphenyl phosphate, tricresyl phosphate, trixylenyl phosphate, tris(isopropylphenyl) phosphate, tris(o- or p-phenylphenyl) phosphate, trinaphthyl phosphate, cresyl diphenyl phosphate, xylenyl diphenyl phosphate, di(isopropylphenyl) phenyl phosphate, o-phenylphenyl dicresyl phosphate, tris(2,6-dimethylphenyl) phosphate, tetraphenyl m-phenylene diphosphate, tetraphenyl p-phenylene diphosphate, phenyl resorcinol polyphosphate, bisphenol A-bis (diphenyl phosphate), bisphenol A-polyphenyl phosphate and dipyrocatechol hypodiphosphate.

7. The plated resin molded article according to claim 1, wherein the aliphatic acid-aromatic phosphate ester of an orthophosphate ester is selected from the group consisting of diphenyl (2-ethylhexyl) phosphate, diphenyl 2-acryloyloxyethyl phosphate, diphenyl 2-methacryloyloxyethyl phosphate, diphenyl neopentyl phosphate, pentaerythritol diphenyl diphosphate and ethyl pyrocatechol phosphate.

8. The plated resin molded article according to claim 1, wherein the condensed phosphate esters is triphenyl phosphate.

9. A method of producing a plated resin molded article according to claim 1, wherein the plated resin molded article is produced by plating metal on the surface of the thermoplastic resin molded article, the method comprising the step of contact-treating the thermoplastic resin molded article with an acid or base that does not contain a heavy metal, as a treatment preceding a metal plating step, and wherein a step of etching with a heavy metal-containing acid is not included.

10. The method of producing a plated resin molded article according to claim 9, comprising the steps of: removing fat of the thermoplastic resin molded article; contact-treating the thermoplastic resin molded article with an acid or base that does not contain heavy metal; and a plating step, wherein the method does not include a step of etching with a heavy metal-containing acid.

11. The method of producing a plated resin molded article according to claim 9, comprising the steps of: removing fat of the plastic resin molded article; contact-treating the thermoplastic resin molded article with an acid or base that does not contain a heavy metal; treating the thermoplastic resin molded article with a catalyst-imparting liquid; and a plating step, wherein the method does not include a step of etching with a heavy metal-containing acid.

12. The method of producing a plated resin molded article according to claim 9, wherein the concentration of the acid or base used in the step of contact-treating with an acid or base that does not contain a heavy metal is less than 4 normal.

13. The method of producing a plated resin molded article according to claim 9, wherein the step of contact-treating with an acid or base that does not contain a heavy metal is a step of immersing the thermoplastic resin molded article in acid or base that does not contain heavy metal.

14. The method of producing a plated resin molded article according to claim 9, wherein the step of contact treating with an acid or base that does not contain a heavy metal is a step of immersing the thermoplastic resin molded article for 20 to 0.5 minutes at a liquid temperature of 10 to 80° C. in an acid or base that does not contain a heavy metal.

15. The method of producing a plated resin molded article according to claim 9, wherein the acid that does not contain a heavy metal is selected from hydrochloric acid, phosphoric acid, sulfuric acid and organic acids.

16. The method of producing a plated resin molded article according to claim 9, wherein the base that does not contain a heavy metal is selected from hydroxides of an alkali metal or alkali earth metal.

* * * * *